INVENTOR
RALPH GRIMES
BY Pearce & Schaeperklaus
Attorneys

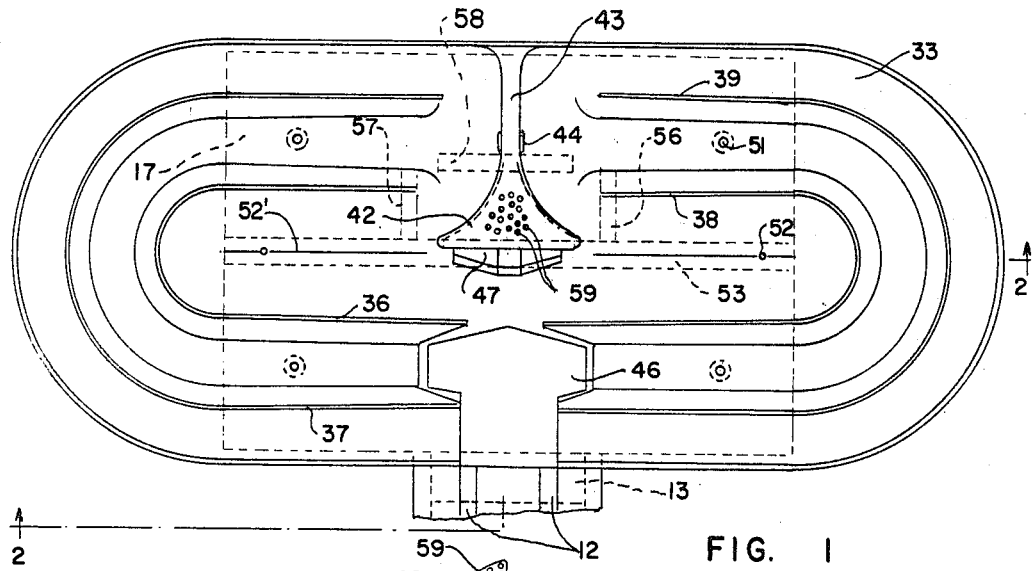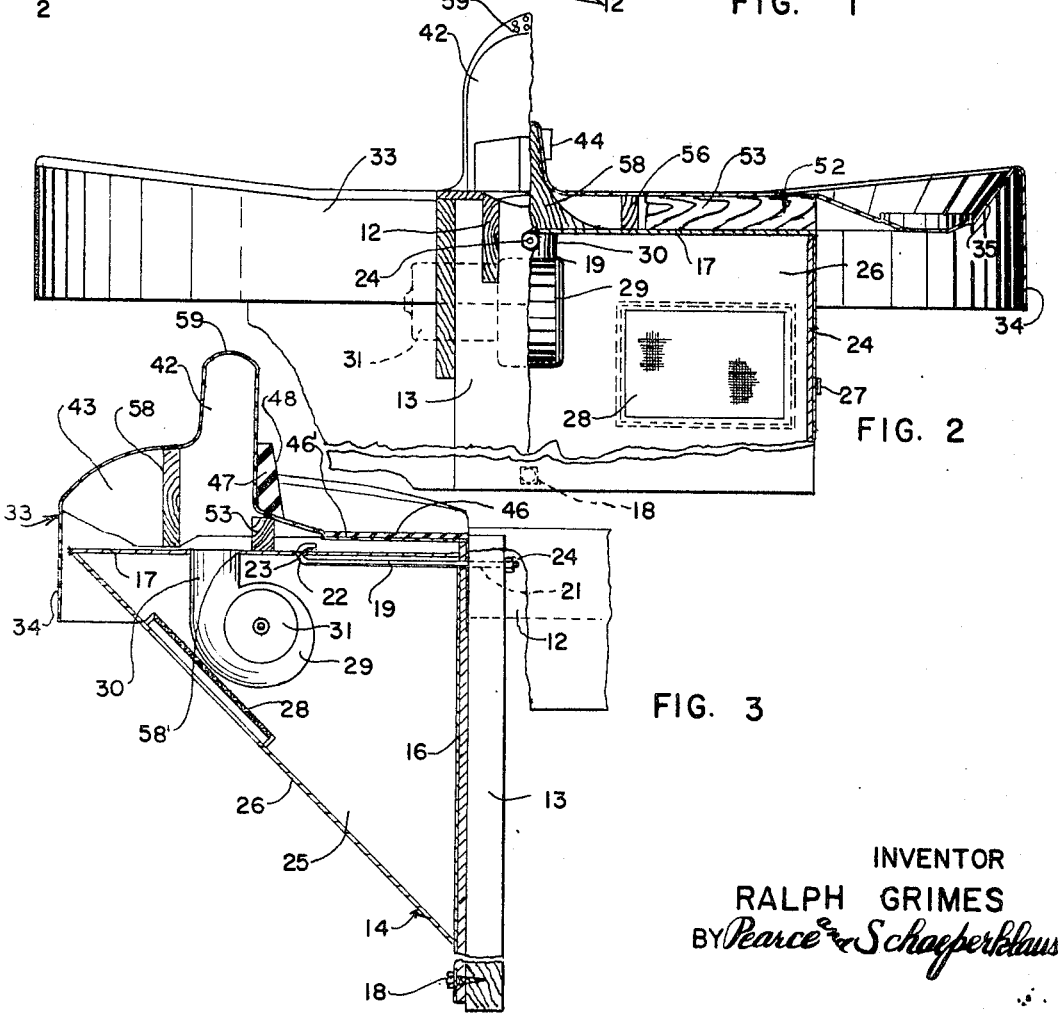

April 1, 1969     R. GRIMES     3,436,078
RACK FOR BOWLING BALLS AND THE LIKE

Filed Nov. 25, 1966     Sheet 3 of 3

INVENTOR.
RALPH GRIMES
BY *Pearce & Schaeperklaus*

Attorneys

United States Patent Office 3,436,078
Patented Apr. 1, 1969

3,436,078
RACK FOR BOWLING BALLS AND THE LIKE
Ralph Grimes, 207 W. Plum St.,
Georgetown, Ohio 45121
Filed Nov. 25, 1966, Ser. No. 596,860
Int. Cl. A63d 5/02
U.S. Cl. 273—47                                    4 Claims

ABSTRACT OF THE DISCLOSURE

A ball storage rack including a pair of U-shaped tracks. Located centrally between the tracks is a horn having an element thereon from arresting balls received from a ball return track. A spur of the horn prevents balls from moving past the terminal ends of the storage tracks and a fan blows air through perforations in the horn.

---

This invention relates to a rack for bowling balls or the like and more particularly to a rack which can be attached to a ball return for receiving balls from two adjacent bowling lanes.

An object of this invention is to provide a rack for bowling balls which can store a number of balls in a small space with the balls readily available for use.

A further object of this invention is to provide such a rack on which balls are stored on a rack shell having substantially U-shaped ball receiving portions.

A further object of this invention is to provide a rack which is adapted to modern bowling establishments which have limited space and cannot satisfactorily accommodate lengthy racks or conventional cluster racks.

A further object of this invention is to provide a rack of this type in which the balls are directed into two groups on opposite sides of a single entry portion of the rack.

A further object of this invention is to provide a rack of this type in which a horn located centrally of the rack shell separates the two groups of balls and is provided with openings in an upper portion thereof through which air is directed for use in drying the hands of bowlers.

The above and other features and objects of the invention will be apparent to those skilled in the art to which this invention pertains from the following detailed description and the drawings, in which:

FIG. 1 is a plan view of a bowling ball rack constructed in accordance with an embodiment of this invention, a portion of a ball return track being shown in association therewith, an edging being removed for clarity;

FIG. 2 is a view in section taken generally on the line 2—2 in FIG. 1;

FIG. 3 is a view in transverse section of the rack and track illustrated in FIG. 1;

In the following detailed description and the drawings, like reference characters indicate like parts.

Figure 4:
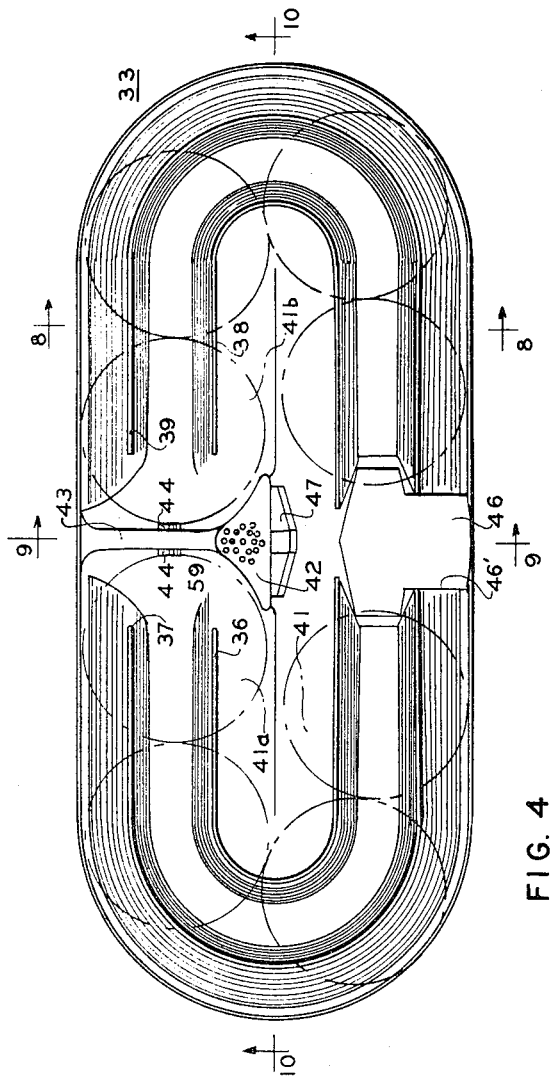
FIG. 4 is a plan view of a shell forming a portion of the rack illustrated in FIGS. 1 to 3, inclusive, the position of the bowling balls thereon being indicated in dot-dash lines.
Figure 5:
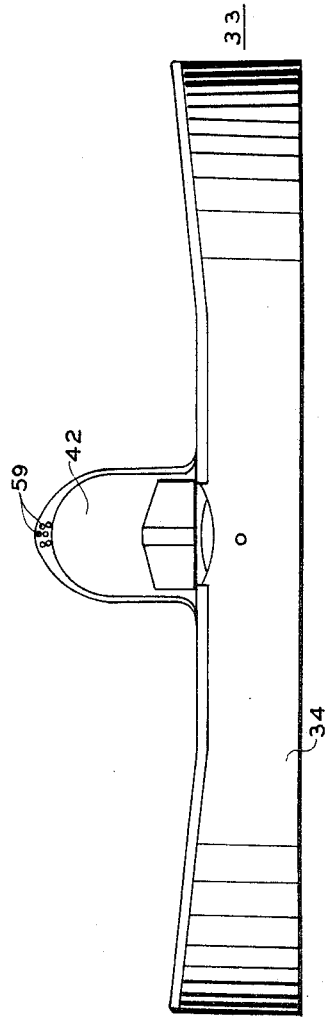
FIG. 5 is a view in front elevation of the shell illustrated in FIG. 4.
Figure 6:
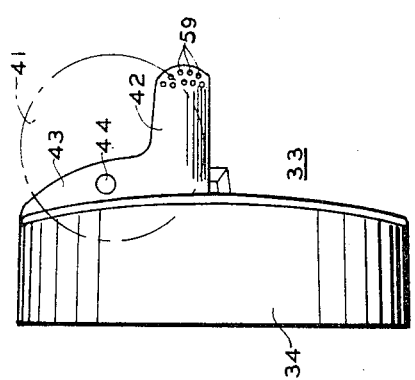
FIG. 6 is a view in end elevation of the shell illustrated in FIG. 4.
Figure 7:
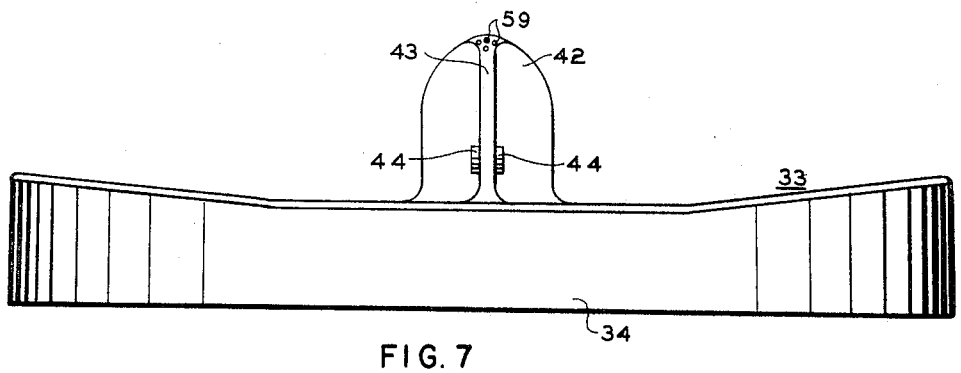
FIG. 7 is a view in rear elevation of the shell illustrated in FIG. 4.
Figure 8:
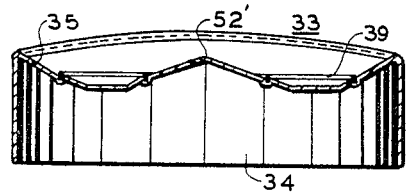
FIG. 8 is a view in section taken on the line 8—8 in FIG. 4.
Figure 9:
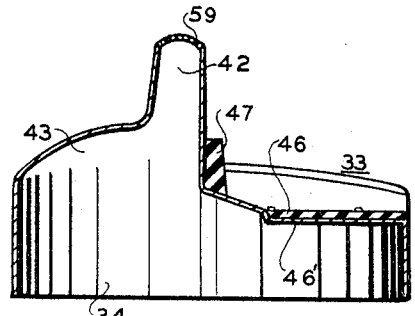
FIG. 9 is a view in section taken on the line 9—9 in FIG. 4.
Figure 10:
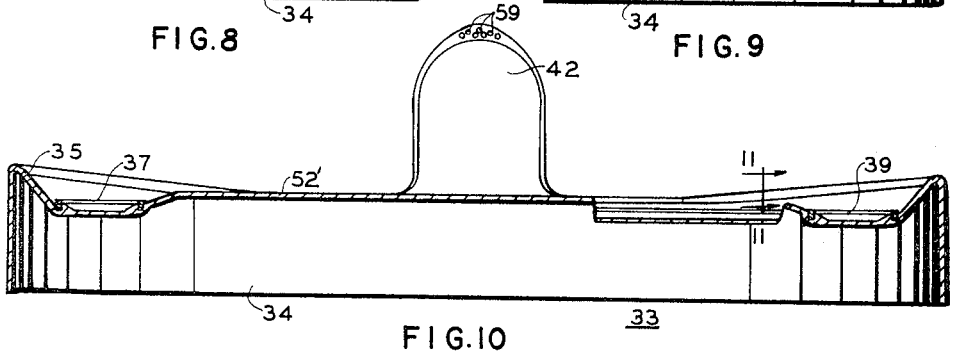
FIG. 10 is a view in section taken on the line 10—10 in FIG. 4.

In FIGS. 1 to 3, inclusive, is shown a bowling ball rack constructed in accordance with an embodiment of this invention. The rack is shown in association with ball return tracks 12 mounted on a pillar 13. The tracks 12 can be of the usual type. Adjacent the pillar 13 is mounted a frame 14 (FIG. 3) which includes an upright plate 16 and a horizontal plate 17. The frame 14 is attached to the pillar 13 by lower fastener means 18 and a J-shaped retainer bolt 19. The bolt 19 extends through a horizontal bore 21 in the pillar 13, and a head 22 of the bolt 19 is received in an opening 23 in the horizontal plate 17. A nut 24 threaded on the bolt 19 engages the pillar 13 to hold the frame 14 and the pillar 13 in assembled relation. Triangular gusset plates 25 at opposite ends of the plates 16 and 17 form a box-like enclosure with the plates 16 and 17. A closure plate 26 completes the box-like enclosure. The closure plate 26 is releasably attached to the gusset plates 25 by appropriate fasteners 27 (FIG. 2, not shown in detail). A grille 28 mounted in the closure plate 26 permits entry of air into the enclosure. A fan 29 mounted inside the enclosure directs air upwardly therefrom through a discharge pipe 30. An electric motor 31 mounted inside the enclosure drives the fan.

A rack shell 33 is mounted on the horizontal plate 17. Details of construction of the rack shell 33 are shown in FIGS. 4 to 11, inclusive. The shell 33 can be formed of resilient plastic material molded to the shape shown or can be formed of other material such as metal or the like. The shell 33 includes an annular upright skirt 34 of substantially oval shape. Inboard of the upper edge of the skirt 34, the shell 33 slopes downwardy and inwardly as indicated at 35 (FIGS. 8 and 11) to a plurality of U-shaped substantially horizontal tracks 36, 37, 38, and 39 (FIGS. 1 and 4), which are arranged in pairs on opposite sides of the shell to form supports on which bowling balls 41 can be received, as shown in FIG. 4. The rack tracks 36, 37, 38, and 39 can be formed of resilient plastic material such as that commonly known as "nylon" and can be set into the material of the shell when the shell is molded so that the rack tracks are firmly held in place therein. A hollow central horn 42 extends upwardly from the shell, and a spur 43 of the central horn separates the balls 41a and 41b and prevents passage of balls past the horn. Rubber bumpers 44 mounted on the spur 43 are engaged by the bowling balls. The bowling balls enter the shell, passing from the return tracks 12 (FIG. 1), to the shell tracks 36, 37, 38, and 39, over a rubber pad 46 which is mounted on the shell 33 in a depression 46' therein and extends rearwardly from the return tracks 12. A rubber bumper 47 mounted on the front face of the horn 42 catches and stops advance of the balls in a direction extending beyond the return tracks 12, so that the bowling balls can advance onto the rack tracks. The bumper 47 has a face 48 which slopes downwardly and toward the return tracks 12, as shown in FIG. 3. The rack tracks can slope downwardly from the return tracks sufficiently to hold the bowling balls thereon.

The shell 33 is attached to the horizontal plate 17 by fasteners 51 which are located between pairs of rack tracks. Other fasteners 52 extend through a central upstanding rib 52' of the shell and into support bar 53 to mount the support bar 53 under the shell and resting on the horizontal plate 17. The bar 53 and filler bars 56, 57, and 58 cooperate to form a box-like enclosure surrounding the open end of the discharge pipe 30 to direct air therefrom up the hollow interior of the horn 42. The discharge pipe 30 extends through an opening 58' in the horizontal plate 17. Small openings or perforations 59 at the upper end of the horn 42 project the air upwardly and outwardly so that the air can be used by bowlers for drying their hands.

Figure 11:
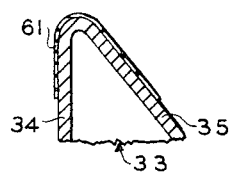
FIG. 11 is a view in section taken on an enlarged scale on the line 11—11 in FIG. 10.

As shown in FIG. 11, a strip of rubber 61 can be adhesively attached to upper edges of the shell where the skirt 34 and the downwardly sloping portion 35 of the shell intersect to protect the edges or can be attached thereto by other suitable means.

When the rack is in use, balls collect on both sides of the horn, and balls on both sides of the horn are readily accessible to the players, but the rack occupies a minimum of floor space. As the balls are removed from the rack for use and return thereto, the balls progress toward the back of the rack where they can be removed without interference with players on their approach and as they bowl. As a ball is removed, it is usual for the next ball to be collected on the side of the shell from which the ball has been removed, and, as the players bowl, on the average, the balls alternate as to the side on which they are collected. The spur 43 prevents inadvertent passage of balls past the horn and maintains the natural sequence of the balls. Ordinarily, the bowler's ball will approach or reach the spur at the back of the rack by the time his turn is reached, and the bowler's ball is ordinarily found at the rear of the rack where it can be picked up without interfering with bowlers on their approach, thus accelerating the game. All balls on the rack can conveniently be reached from the back of the rack so that even if the bowler's ball has not reached the spur, it can be picked up from the back of the rack.

The rack construction illustrated in the drawings and described above is subject to structural modification without departing from the spirit and scope of the appended claims.

Having described my invention, what I claim as new and desire to secure by Letters Patent is:

1. A rack for balls which comprises a body shell, a horn extending upwardly substantially centrally of the body shell, U-shaped tracks on the body shell and having respective ball receiving end portions and terminal ends, said tracks extending from said ball receiving portions toward said horn, means for directing balls crosswise of the ball receiving portions of the tracks and toward the horn, means on the horn for arresting the balls, the balls being received on the tracks from the arresting means and collecting on the tracks to be stored thereon, means precluding said balls from moving therealong past said terminal ends, an upper portion of the horn being perforated, and means for projecting air upwardly through the horn to be discharged through the perforations.

2. A rack in accordance with claim 1 wherein said precluding means includes a divider spur on the horn separating said terminal ends of the tracks to divide the balls into two separate sections on opposite end portions of the shell, the spur preventing inadvertent passage of balls past the horn and maintaining the natural sequence of the balls.

3. A rack as in claim 1 wherein the shell is mounted on a substantially horizontal plate, there is an opening in said plate underlying the horn, and the means for projecting air upwardly is fan means provided beneath the plate projecting air upwardly through the opening and through the horn.

4. A rack as in claim 3 wherein a hollow enclosure surrounds the fan, the horizontal plate forms a wall of the enclosure, and an opening in the enclosure permits entry of air to the fan.

References Cited

UNITED STATES PATENTS

| | | | |
|---|---|---|---|
| 2,175,750 | 10/1939 | Edwards | 273—47 |
| 2,949,301 | 8/1960 | Bay | 273—47 |
| 3,042,402 | 7/1962 | Ernst | 273—47 |

ANTON O. OECHSLE, *Primary Examiner.*